United States Patent [19]
Takahashi et al.

[11] Patent Number: 5,950,425
[45] Date of Patent: Sep. 14, 1999

[54] EXHAUST MANIFOLD COOLING

[75] Inventors: Masanori Takahashi; Hiroshi Oishi, both of Hamamatsu, Japan

[73] Assignee: Sanshin Kogyo Kabushiki Kaisha, Hamamatsu, Japan

[21] Appl. No.: 08/814,549

[22] Filed: Mar. 11, 1997

[30]     Foreign Application Priority Data

Mar. 11, 1996  [JP]  Japan .................................. 8-082009
Apr. 5, 1996   [JP]  Japan .................................. 8-108593

[51] Int. Cl.⁶ ................................ F01N 3/02; F01N 7/10
[52] U.S. Cl. .............................................. 60/321; 60/323
[58] Field of Search .............................. 60/320, 321, 323

[56]            References Cited

U.S. PATENT DOCUMENTS

| | | | |
|---|---|---|---|
| 2,026,848 | 1/1936 | Ruber ......................................... | 60/321 |
| 3,431,882 | 3/1969 | Irgens . | |
| 3,750,403 | 8/1973 | Deutschmann et al. .............. | 60/321 X |
| 3,946,697 | 3/1976 | Hackbarth et al. .................... | 60/320 X |
| 3,994,129 | 11/1976 | Sakurai et al. ......................... | 60/323 X |
| 4,401,061 | 8/1983 | Matsushita et al. . | |
| 4,588,385 | 5/1986 | Suzuki et al. . | |
| 4,621,595 | 11/1986 | Suzuki ................................... | 60/320 X |

FOREIGN PATENT DOCUMENTS 2055422A  4/1981  United Kingdom .

*Primary Examiner*—John E. Ryznic
*Attorney, Agent, or Firm*—Knobbe, Martens, Olson & Bear LLP

[57]            ABSTRACT

An internal combustion engine of the type utilized to power an outboard motor and having a cooling arrangement for reducing the transmission of heat from exhaust gases flowing through an exhaust passage from the engine to the combustion chambers of the engine, is disclosed. In general, the cooling arrangement comprises an air-filled space formed in the cylinder block between the combustion chambers and the exhaust passage. In a first arrangement, when the engine is of the in-line variety and the combustion chambers are vertically arranged, air spaces are formed between a common vertically extending exhaust passage leading to an exhaust pipe, and each combustion chamber. In a second arrangement, when the engine is of the "V" type, an air space is formed in the portion of the cylinder block defining the inside wall of each cylinder bank, between each combustion chamber and a common exhaust passage extending through the valley between the cylinder banks.

13 Claims, 16 Drawing Sheets

5,950,425

EXHAUST MANIFOLD COOLING

FIELD OF THE INVENTION

The present invention relates to a cooling arrangement for an exhaust manifold of an internal combustion engine. More particularly, the present invention is an arrangement for reducing heat transfer from exhaust gases passing through a common exhaust passage to one or more adjacent combustion chambers in a cylinder block of an engine.

BACKGROUND OF THE INVENTION

Watercraft are often powered by outboard motors positioned at the stern of the craft. These motors have an internal combustion engine positioned within a cowling of the motor. For among other reasons, because the outboard motor is positioned at the stern of the craft, and because the motor is tiltable, it is desirable to keep the engine's size and weight to a minimum.

In order to keep the engine small, its various parts are typically mounted much closer to one another than might be the case with similar types of engines utilized in other settings. One problem which arises in these engines relates to keeping various of the components of the engine cool when they are so close to one another. The cooling problem is further aggravated by the fact that the engine is positioned within an enclosed cowling, trapping the heat therein.

One engine feature which is especially difficult to keep cool is the exhaust manifold. If this feature of the engine is not adequately cooled, large quantities of heat are transferred from the exhaust gases passing therethrough to other portions of the engine. This heat may damage other engine components. In particular, if heat is transferred from the exhaust gases to the combustion chambers, the combustion efficiency of the engine is greatly reduced, lessening engine power output. In addition, if the combustion chambers become too hot, the lubricating oil may be scorched and burned, reducing its effectiveness. The cylinder walls, pistons or rings may also be warped or damaged.

Some mechanisms have been proposed for cooling these exhaust manifolds, including positioning them in a cooling water jacket. The use of a cooling water jacket greatly complicates the exhaust and cooling system, however, and adds weight and size to the engine.

A cooling arrangement for an exhaust manifold which overcomes the problems associated with the prior art, is desirable.

SUMMARY OF THE INVENTION

In accordance with the present invention there is provided a cooling system for an exhaust manifold of an internal combustion engine powering an outboard motor. In general, the present invention comprises positioning an air-filled insulating space between the combustion chambers and the main exhaust passage into which exhaust flows from the combustion chambers of the engine. In one form of the invention, the air filled space is enclosed, with air trapped therein. In a second form of the invention, the air-filled space is open to the exterior of the engine, permitting air to flow in and out of the space. In any arrangement, the space preferably extends through the cylinder block into an adjoining portion of a cylinder head of the engine.

The cooling arrangement of the present invention is particularly well-suited to an internal combustion engine of the inline variety for powering an outboard motor. In this arrangement, at least two combustion chambers are arranged vertically and defined by a cylinder head cooperating with a cylinder block. Each combustion chamber has an exhaust outlet passage leading therefrom to a common exhaust passage. The common exhaust passage is also preferably vertically arranged, and leads to an exhaust pipe at the bottom end of the engine. The exhaust passage is preferably formed within the cylinder block.

In order to limit the transfer of heat from the exhaust gases flowing through the common exhaust passage, one or more air filled spaces are provided in the cylinder block and connected cylinder head, between the exhaust passage and each combustion chamber.

The cooling arrangement of the present invention is also suited for use in other engine arrangements, such as a "V"-type engine. When used with a "V"-type engine, the cylinder block defines a first cylinder bank and a second cylinder bank with a valley therebetween. A cylinder head is connected to each bank for defining at least one combustion chamber in each bank.

An exhaust outlet passage leads from each combustion chamber through its respective cylinder head to a common exhaust passage. Preferably, the common exhaust passage is formed within the cylinder block and extends through the valley portion of the cylinder block between the cylinder banks.

In order to limit the transfer of heat from exhaust gases flowing through the common exhaust passage to the combustion chambers in the banks on either side thereof, an air-filled space is preferably provided between the common exhaust passage and the combustion chambers in each cylinder bank and adjacent head. Preferably, the space generally has a "V" shape, extending from a common passage within the valley of the cylinder block and below the common exhaust passage, upwardly along each cylinder bank into each head.

Further objects, features, and advantages of the present invention over the prior art will become apparent from the detailed description of the drawings which follows, when considered with the attached figures.

DETAILED DESCRIPTION OF THE PREFERRED EMBODIMENTS OF THE INVENTION

In accordance with the present invention, there is provided an outboard motor 20 having an engine with an exhaust manifold cooling arrangement in accordance with the present invention.

Figure 1:
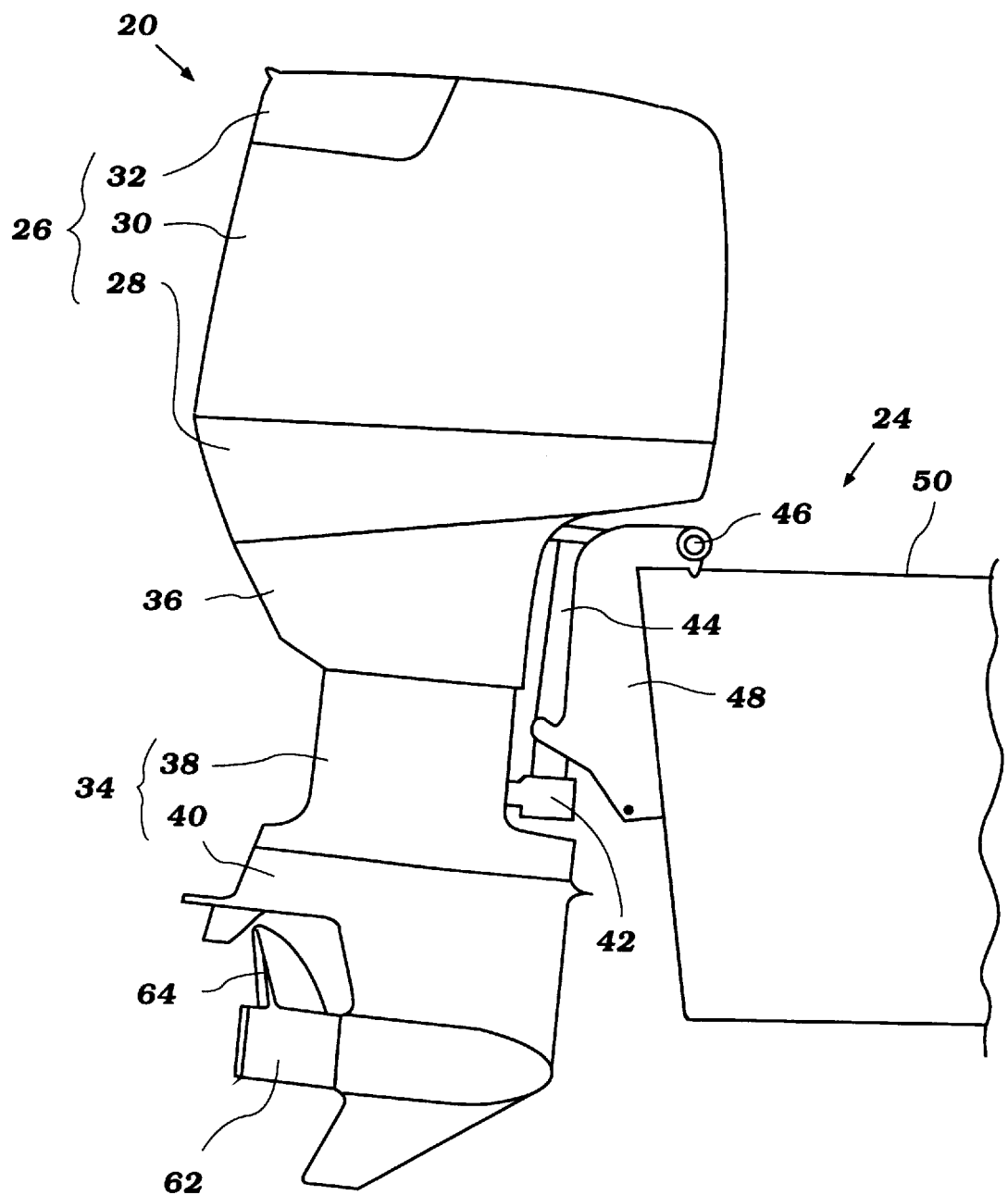
FIG. 1 is a side view of an outboard motor connected to a hull of a watercraft for powering the watercraft.

As best illustrated in FIG. 1, the outboard motor 20 is utilized to power a watercraft 24. The outboard motor 20 has a powerhead area 26 comprised of a lower tray portion 28 and a main cowling portion 30. An air inlet or vent 32 is provided in the main cowling portion 30 for providing air to an engine therein, as described in more detail below. The motor 20 includes a lower unit 34 extending downwardly therefrom, with an apron 36 providing a transition between the powerhead 26 and the lower unit 34. The lower unit 34 comprises an upper or "drive shaft housing" section 38 and a lower section 40.

A steering shaft, not shown, is affixed to the lower section 40 of the lower unit 34 by means of a bracket 42. The steering shaft is supported for steering movement about a vertically extending axis within a swivel bracket 44. The swivel bracket 44 is connected by means of a pivot pin 46 to a clamping bracket 48 which is attached to a transom portion of a hull 50 of the watercraft. The pivot pin 46 permits the outboard motor 20 to be trimmed and tilted up about the horizontally disposed axis formed by the pivot pin 46.

Figure 2:
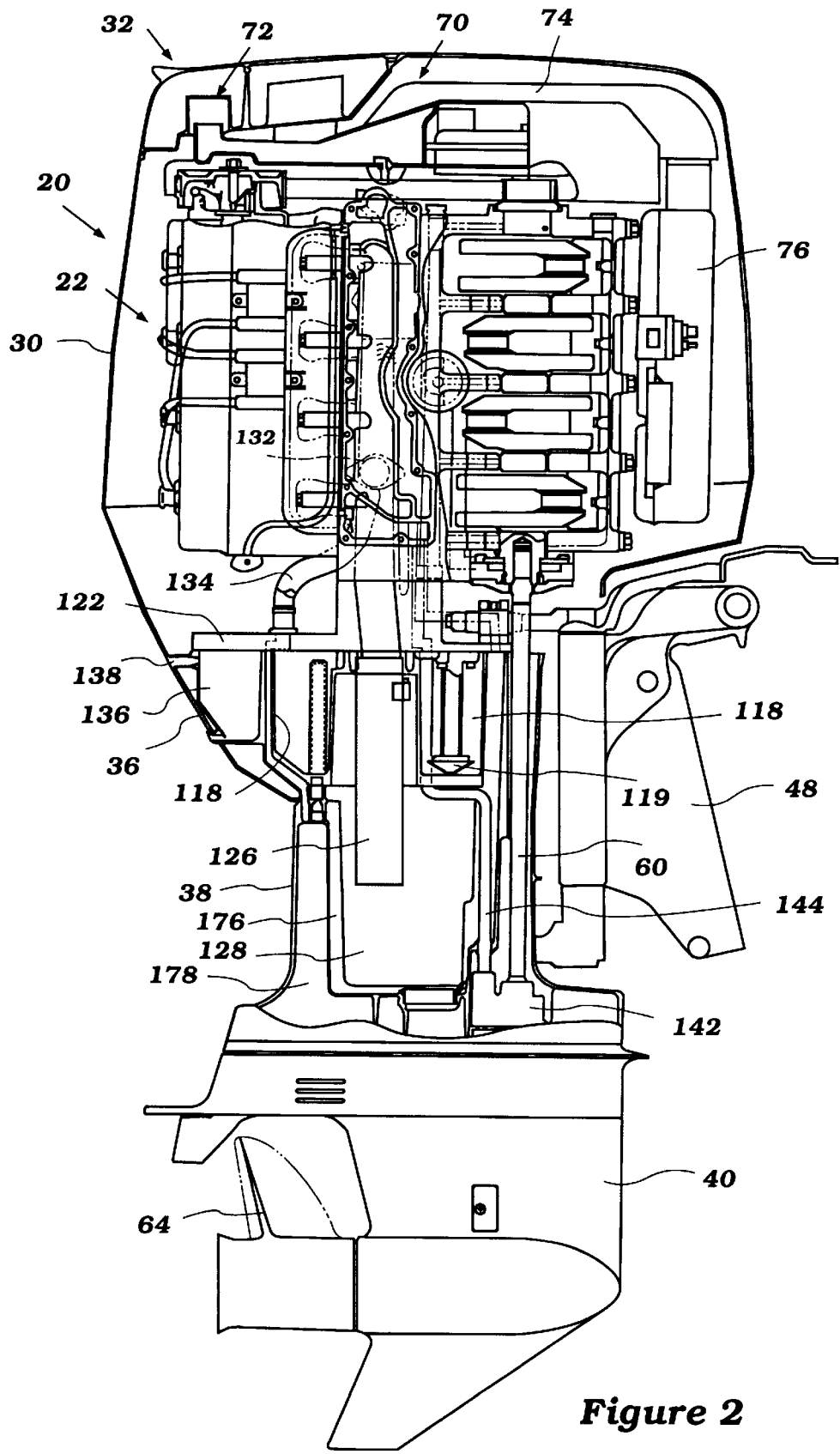
FIG. 2 is a side view, in partial cross-section, illustrating an internal combustion engine of the inline variety having an exhaust cooling arrangement in accordance with the present invention for use in powering the motor illustrated in FIG. 1.
Figure 3:
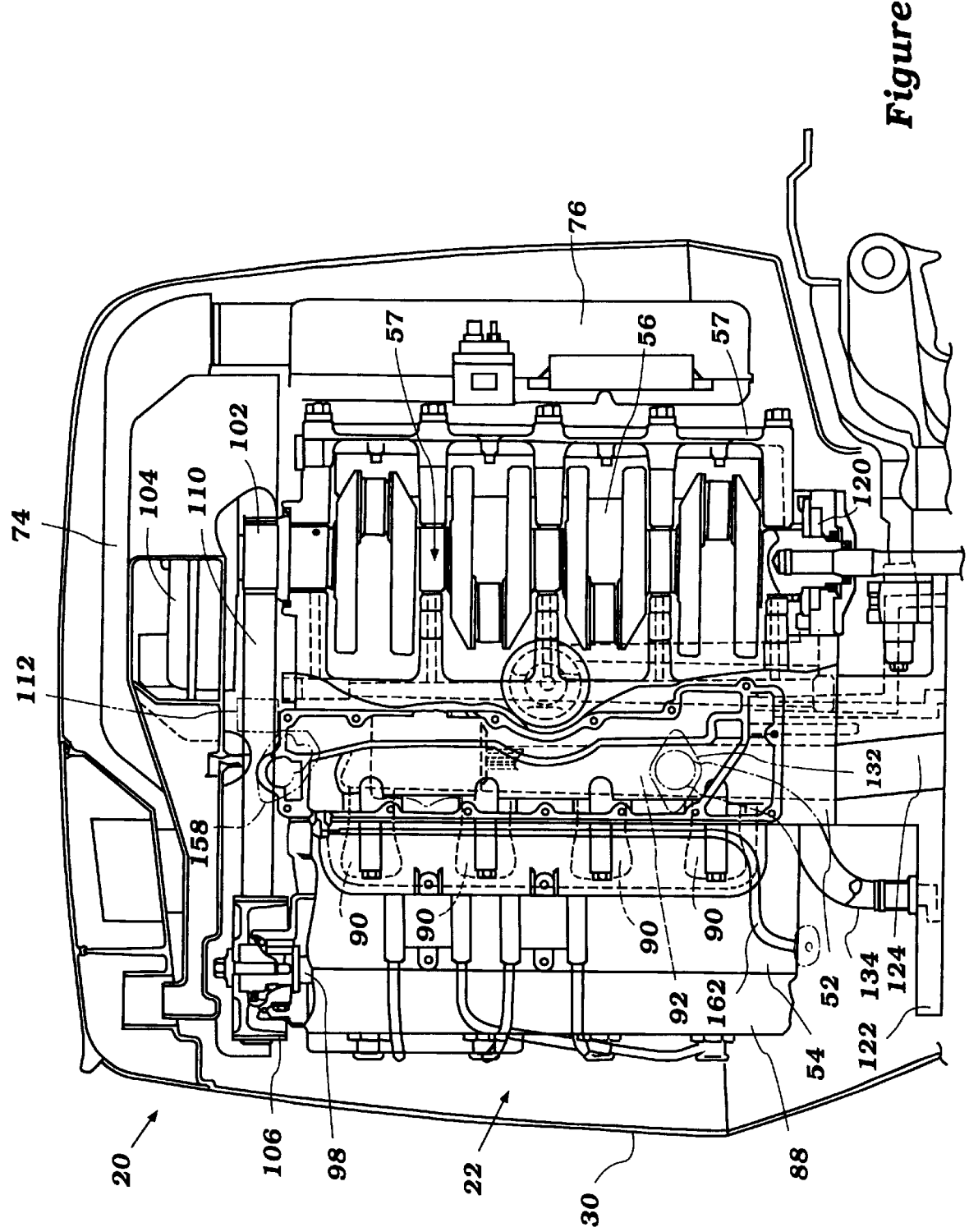
FIG. 3 is an enlarged view of a the engine illustrated in FIG. 2.

As best illustrated in FIGS. 2 and 3, the power head 26 of the outboard motor 20 includes the engine 22 which is positioned within the cowling portion 30. In the embodiment of the present illustrated in FIGS. 2–8, the engine 22 is preferably of the inline, four-cylinder, four-cycle variety, and thus includes a cylinder block 52 which has a cylinder bank closed by a cylinder head assembly 54 in a manner which will be described. As also illustrated in FIGS. 2 and 3, the engine 22 is preferably oriented within the cowling 30 such that its cylinder head 54 is positioned on the block 52 on the side opposite the watercraft's transom.

A crankshaft 56 is rotatably journalled in a crankcase chamber 57 formed by the cylinder block 52 a crankcase cover 53. As is typical with outboard motor practice, the engine 22 is mounted in the power head 26 so that the crankshaft 56 rotates about a vertically extending axis. This facilitates coupling to a drive shaft 60 in a manner which will be described.

The drive shaft 60 depends into the lower unit 34, wherein it drives a conventional bevel gear and a forward-neutral-reverse transmission. The transmission is not illustrated herein, because its construction per se forms no part of the invention. Therefore, any known type of transmission may be employed.

The transmission drives a propeller shaft which is journalled within the lower section 40 of the lower unit 34 in a known manner. A hub 62 of a propeller 64 is coupled to the propeller shaft for providing a propulsive force to the watercraft 24 in a manner well known in this art.

Figure 7:
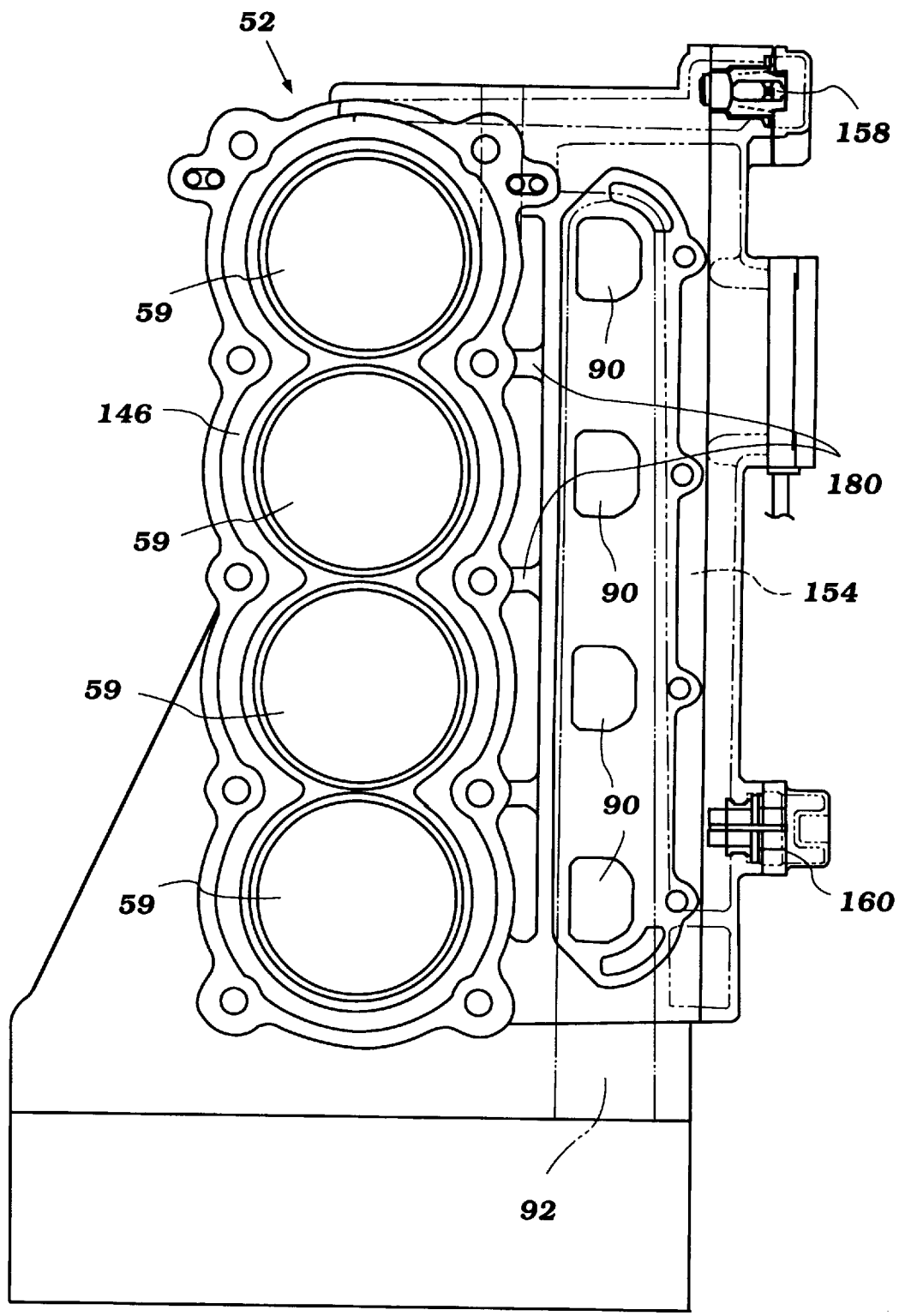
FIG. 7 is a top view of a cylinder block of the engine illustrated in FIG. 6, taken along the line indicated as 7—7 therein.

The construction of the engine 22 and the exhaust manifold cooling arrangement of the present invention will now be described in more detail. As illustrated in FIGS. 2, 3 and 7, the engine 22 has a number of variable volume combustion chambers 59, preferably totaling four in number, arranged in vertical, inline fashion. It should be understood that there may be as few a one combustion chamber, or more than four.

Each combustion chamber has a piston 66 mounted therein for reciprocation, the piston connected to the crankshaft 56 via a connecting rod 68. The crankshaft 56 rotates within a crankcase chamber 57 defined by the cylinder block 52 and the cover 53 connected thereto. The cover 53 is preferably connected to the cylinder block 52 via a number of bolts, as is known in the art.

As illustrated in FIGS. 2, 3, 5 and 6, an intake system 70 provides air to each combustion chamber. The intake system 70 includes an air intake 72 positioned adjacent the vent 32 in the cowling 30. As best illustrated in FIG. 2, air drawn through this intake 72 passes into an air passage formed between the cowling 30 and a camshaft drive cover 74 positioned on the top of the engine 22, to a surge tank 76. Air is routed from the surge tank 76 by a runner 78 to inlet passages 80 positioned within the cylinder head 54 leading to the combustion chamber. An inlet passage 80 is provided corresponding to each combustion chamber 59.

Means are provided for controlling the passage of air through each inlet passage 80 to the combustion chambers 59. Preferably, this means comprises an intake valve 82. As illustrated, all of the intake valves 82 are preferably actuated by an intake camshaft 84. The intake camshaft 84 is mounted for rotation with respect to the head 54 and connected thereto with a number of brackets 86. The camshaft 84 is enclosed by a camshaft cover 88 which is connected to the head 54.

An exhaust system is provided for routing the products of combustion within the combustion chambers 59 to a point external to the engine 22. In particular, an exhaust passage 90 leads from each combustion chamber to a passage 92 in an exhaust manifold portion 94 of the engine 22. The remainder of the exhaust system will be described in more detail below.

Means are also provided for controlling the flow of exhaust from each combustion chamber 59 to its respective exhaust passage 92. Preferably, this means comprises an exhaust valve 96. Like the intake valves 82, the exhaust valves 96 are preferably all actuated by an exhaust camshaft 98. The exhaust camshaft 98 is journalled for rotation with respect to the cylinder head 54 and connected thereto with a number of brackets 100. The exhaust camshaft 98 is enclosed within the camshaft cover 88.

Figure 5:
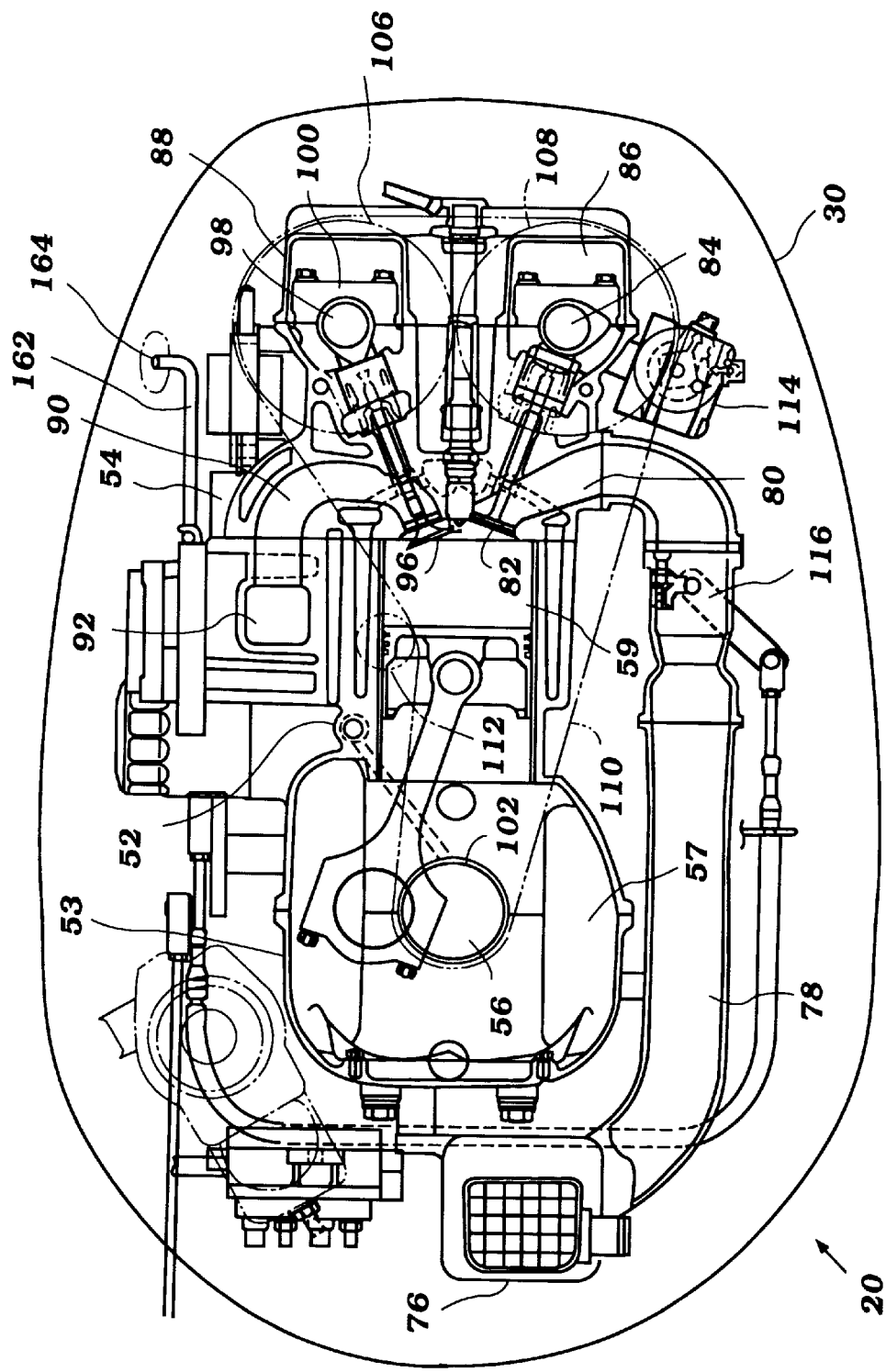
FIG. 5 is a top view of the engine illustrated in FIG. 2.

As best illustrated in FIGS. 3 and 5, means are provided for driving the camshafts 84,98. A timing belt pulley 102 is mounted on a top end of the crankshaft 56 positioned outside of the cylinder block 52, and just below a flywheel 104 also positioned on the crankshaft 56. An exhaust camshaft pulley 106 is mounted on an end of the exhaust camshaft 98 extending from the top end of the engine 22, and an intake camshaft pulley 108 is mounted on an end of the intake camshaft 84 extending from the top end of the engine. A drive belt 110 extends around the timing belt pulley 102 and the exhaust and intake camshaft pulleys 106,108, whereby the camshaft 56 indirectly drives the camshafts 84,98. One or more tensioner pulleys 112 may be provided for maintaining the belt in a taunt condition.

A fuel delivery system is provided for delivering fuel to each combustion chamber 59 for combustion therein. The fuel delivery system preferably includes a fuel tank (not shown) and a fuel pump 114 for pumping fuel from the tank and delivering it to each combustion chamber 59. As known to those skilled in the art, the fuel may be delivered into the incoming air stream, such as with a carburetor or fuel injector, or directly injected into the combustion chamber with a fuel injector.

A throttle 116 is provided for controlling the flow of air into each combustion chamber 59. Preferably, the throttle 116 comprises a moveable plate positioned within the runner 78. The throttle 116 is preferably controlled through a cable by the operator of the watercraft 24.

A suitable ignition system is provided for igniting an air and fuel mixture within each combustion chamber 59. Such systems are well known to those skilled in the art, and as such forms no portion of the invention herein, such is not described in detail here.

The engine 22 includes a lubricating system for providing lubricant to the various portions of the engine. The lubricating system is not described in detail here, and may be of any type found a suitable to those skilled in the art. Generally, the lubricating system includes an oil reservoir 118 positioned below the engine 22. The reservoir 118 is in communication with an oil pump 120 via a suction tube 119. The oil pump 120 is preferably positioned on the end of the crankshaft 56 at the bottom of the engine 22. The oil pump 120 pumps lubricant from the reservoir 118 through oil passages throughout the engine 22. The pumped oil drains from the engine 22 back to the reservoir 118 for recirculation by the pump 120.

Figure 6:
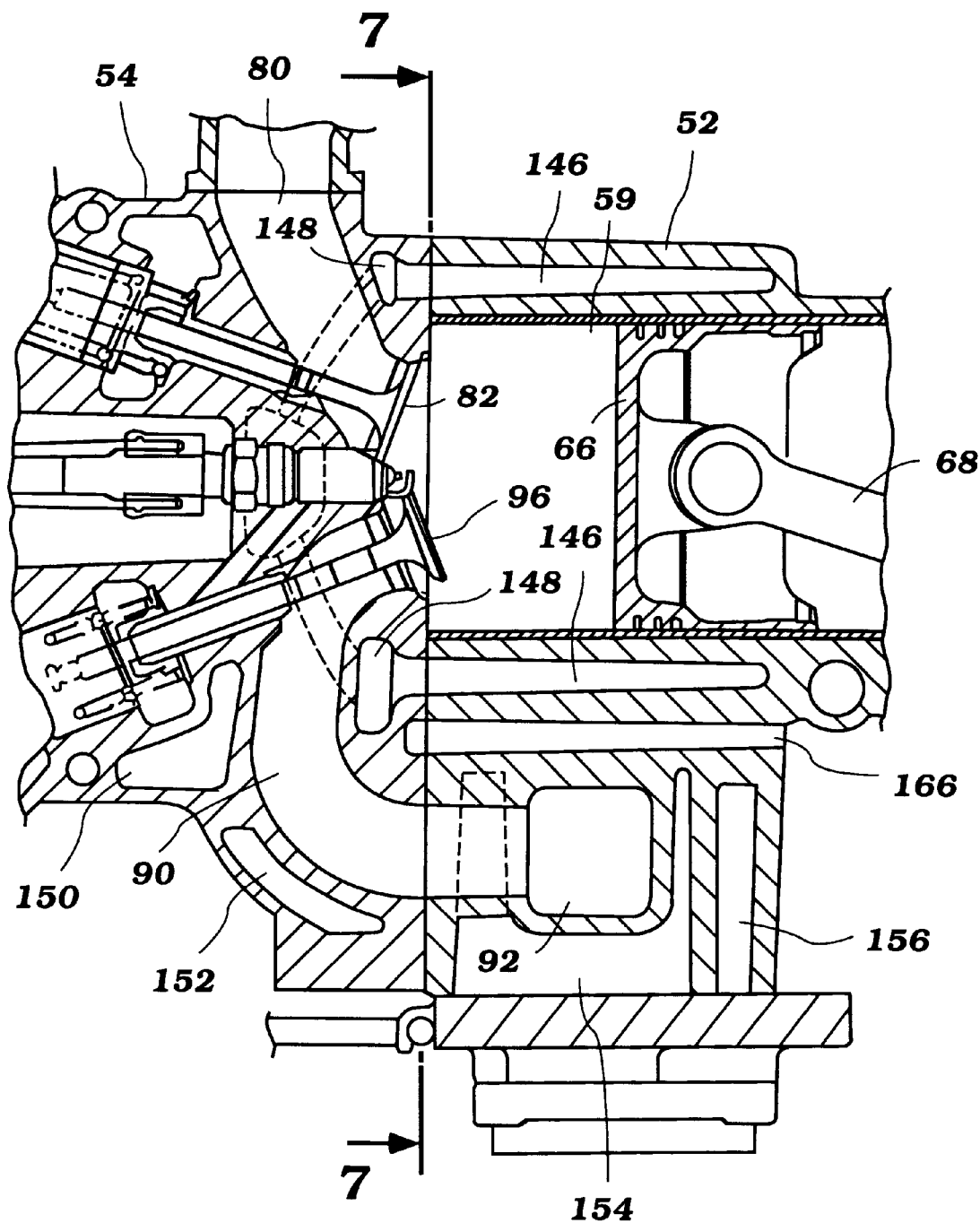
FIG. 6 is a partial cross-sectional view of a cylinder block, head and exhaust manifold of the engine illustrated in FIG. 2, having a cooling arrangement in accordance with a first embodiment of the present invention.

As illustrated in more detail in FIG. 6 (and in an alternate embodiment in FIG. 8), the exhaust manifold is preferably formed integrally with the cylinder block 52. In this arrangement, the common exhaust passage 92 is simply a passage extending generally vertically through a portion of the cylinder block 52.

Figure 4:
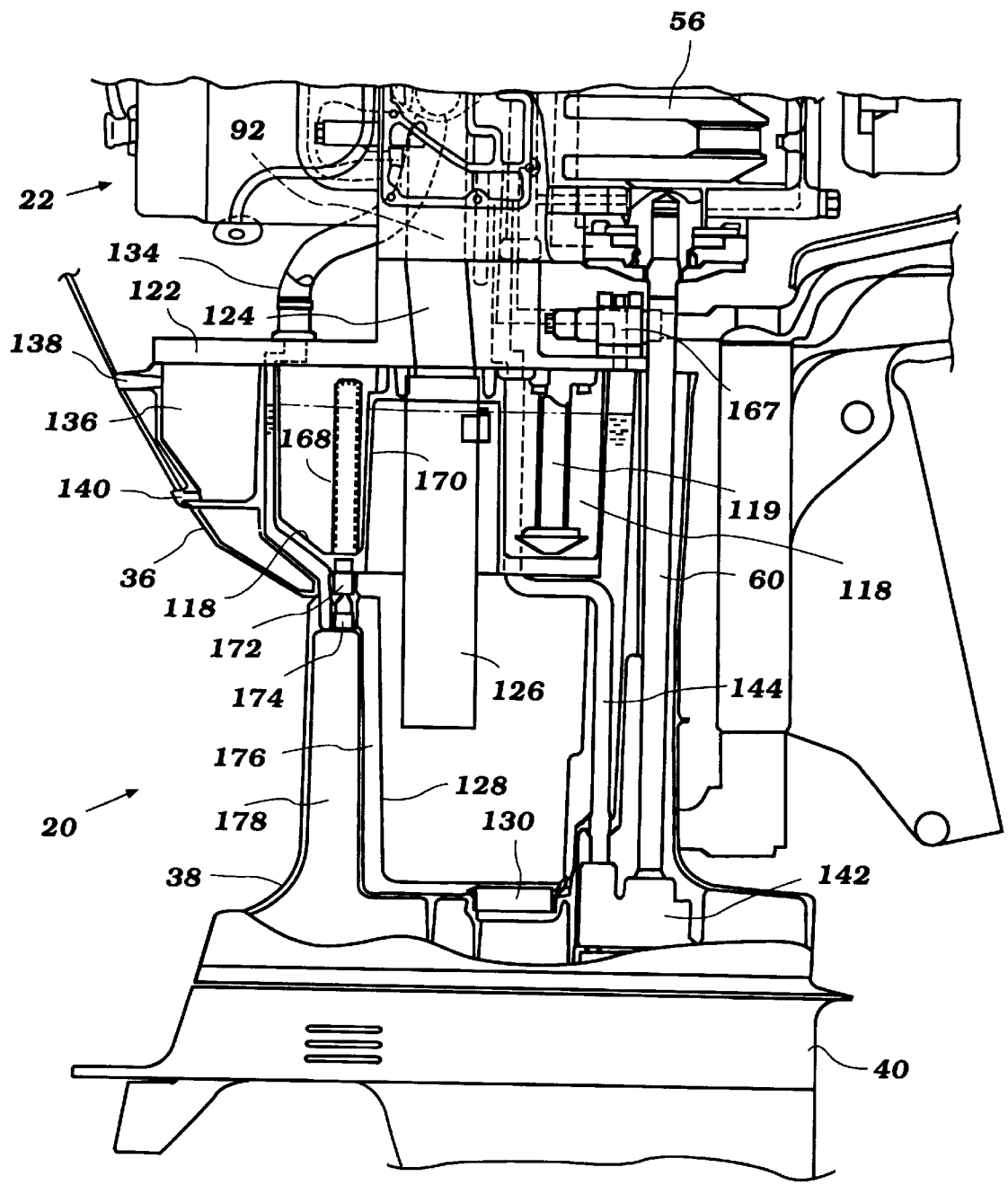
FIG. 4 is an enlarged view of a lower portion of the engine illustrated in FIG. 2 and motor components related thereto.

As best illustrated in FIG. 4, an exhaust guide 122 is positioned at the bottom end of the engine 22. The exhaust guide 122 has a passage 124 extending therethrough which is aligned with the common exhaust passage 92 at its top side. An exhaust pipe 126 is connected to the bottom side of the exhaust guide 122 in alignment with the passage 124. The exhaust pipe 126 terminates within a chamber of a muffler 128.

The muffler 128 is positioned within the lower unit 38 between the drive shaft 60 and a cooling water drain system. An exhaust gas outlet 130 is provided in the bottom end of the muffler 128, through which the exhaust gas is routed to a point external of the motor 20, normally through a passage extending through the hub 62 of the propeller 64.

When the exhaust pressure is low, which is often the case when the engine speed is low, the exhaust gas is diverted to an above-water exhaust gas discharge. In the embodiment illustrated in FIG. 2, this discharge comprises an expansion chamber 136 and first and second exhaust ports 138,140. The exhaust ports 138,140 extend through the apron 36 from the chamber 136 for exhausting gases therefrom. The lower exhaust port 140 allows condensed liquids to drain from the chamber 136.

A cooling system is provided for cooling the engine 22. More particularly, and in accordance with the present invention, the cooling system serves to cool the exhaust manifold area 94 of the engine, so as to reduce the transmission of heat from the exhausted gases through the walls defining the passage 92 to the combustion chambers 59. Preferably, this cooling system accomplishes cooling with both a gas, such as air, and a liquid, such as water.

Figure 8:
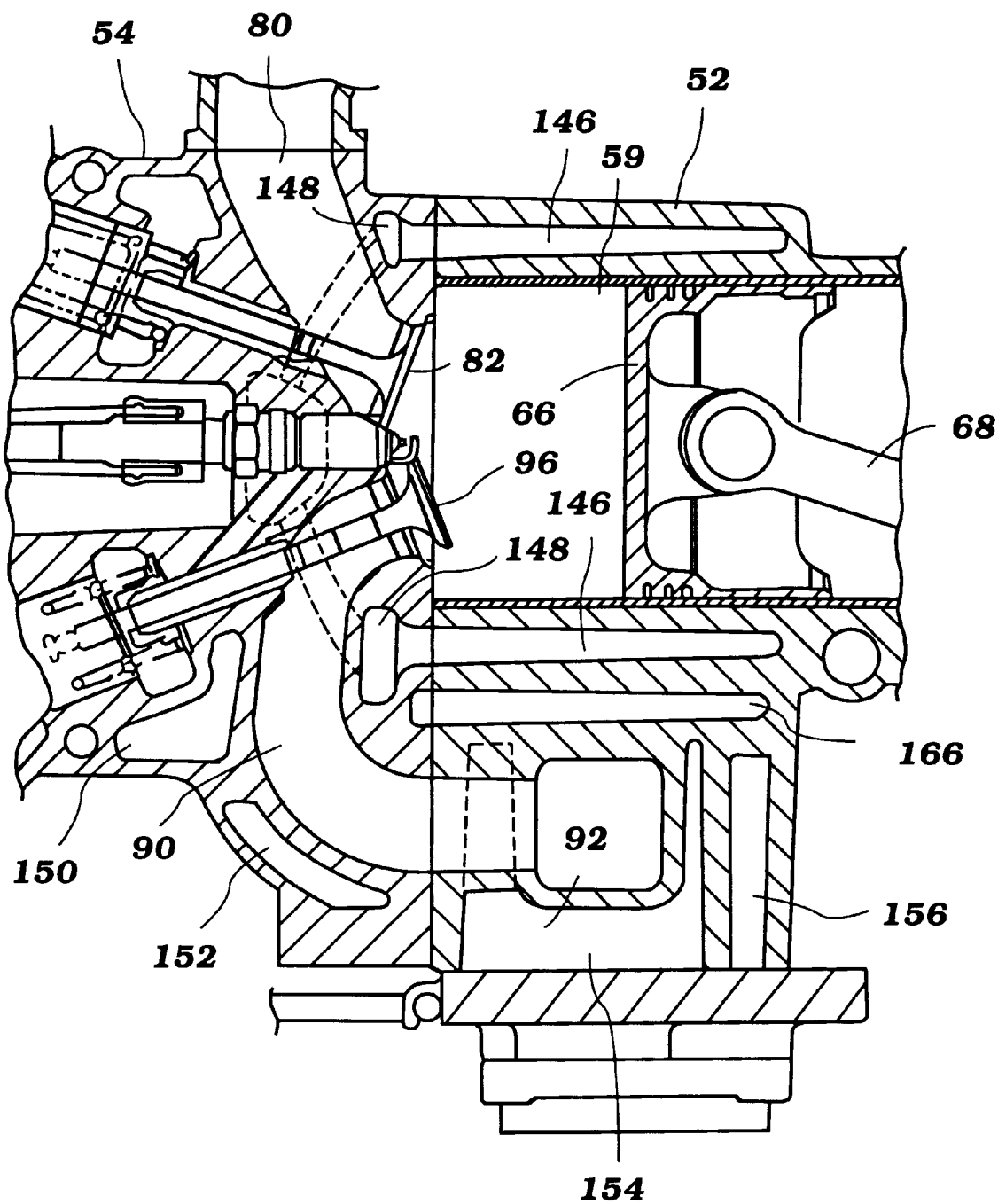
FIG. 8 is a partial cross-sectional view of a cylinder block, head and exhaust manifold of the engine illustrated in FIG. 2, having a cooling arrangement in accordance with a second embodiment of the present invention.

First, cooling water is pumped by a water pump 142 positioned in the lower unit 34 from the body of water in which the motor 22 is positioned. The pump 142 is preferably driven by the drive shaft 60, and expels the cooling water upwardly through a cooling water delivery pipe 144. This cooling water passes into a number of cooling water passages extending throughout the cylinder block 52 and head 54. As best illustrated in FIGS. 6–8, these passages include a water jacket 146 surrounding the combustion chambers 59 and corresponding passages 148 in the cylinder head 54. Cooling water passages 150,152 are further provided in the cylinder head 54 adjacent the exhaust valves 96 and exhaust passages 90. A cooling water passage 154 is preferably provided in the manifold portion 94 of the cylinder block 52 on a side of the exhaust passage 92 defined therein opposite the combustion chambers 59. The cooling water is expelled from the engine 22 through a generally vertically extending cooling water outlet or return passage 156.

As known to those skilled in the art, the cooling system preferably includes a thermostat 158 for controlling the flow of cooling water through the various coolant water passages. Preferably, the thermostat 158 is arranged to prevent the passage of cooling water through the engine 22 to the return passage 156 when the temperature of the coolant in the engine is below a pre-determined temperature, thereby allowing the engine to warm up.

In addition, the cooling system includes a coolant pressure relief valve 160. This valve 160 is in communication with the cooling water passage 154, and has a line 134 extending to a cooling water chamber 176, described in more detail below. In the instance where the cooling water pressure within the cooling passages exceeds a predetermined pressure, the pressure relief valve 160 opens, allowing cooling water to flow through the line 134 to the chamber 176.

A cooling water tell-tale is provided so that the operator of the watercraft 24 may readily verify that cooling water is being provided to the engine 22. In particular, a pilot line 162 extends to a part 164 from one of the cooling water passages. Coolant under pressure is delivered through the line 162 and out the part 164, which is above the water line, evidencing to the operator that cooling water is being provided to the engine.

Cooling water which circulates through the engine 22 to the outlet 156 passes through a cooling water discharge pipe 167 into a cooling water pool or chamber 176 which extends around the oil tank 118, muffler 128 and other components. An overflow pipe 168 has its top end positioned in the chamber 176, and extends to first and second passages 172,174 leading to a discharge tank 178. Cooling water in the discharge tank 178 is discharged from of the motor 20 back to the body of water from which it was drawn.

In accordance with the present invention, there is provided means for cooling or insulating for reducing the heat transmission from the exhaust passing through the exhaust passage 92 to the combustion chambers 59. Preferably, this means comprises an air space 166 between the passage 92 and each combustion chamber 59. In a first arrangement illustrated in FIG. 6, separate spaces 166, each having the form of an elongate passage extending from the exterior of the cylinder block 52 inwardly therethrough to an adjoining portion in the cylinder head 54, are positioned within the block. The spaces 166 are preferably positioned between the common exhaust passage 92 and the cooling water jacket 146 surrounding the combustion chambers 59.

As illustrated in a second embodiment in FIG. 8, the space 166 comprises an enclosed chamber which is not in communication with the air space outside of the cylinder block and head 52,54.

As illustrated in FIG. 7, web sections 180 are preferably provided between the spaces 166 for maintaining strength and rigidity of the cylinder block 52.

In the arrangement illustrated in FIG. 6, the air cooling arrangement for the exhaust manifold 94 portion of the cylinder block 52 serves to both cool, in the form of active movement of air into and out of the space 166, and to insulate. In particular, hot air within the spaces 166 may be displaced by cooler air, whereby a cooling by circulation of air occurs.

In both arrangements, and especially the second arrangement illustrated in FIG. 8, the cooling arrangement works by insulating the combustion chambers 59 from the exhaust passage 92. In particular, the air within the spaces 166 is ineffective in transmitting heat from the portion of the block 52 defining the exhaust passage 92 to the combustion chambers 59.

Yet another arrangement of the present invention with an engine is illustrated in FIGS. 9–16. These figures illustrate the cooling arrangement of the present invention as adapted to a "V"-type engine for powering an outboard motor 20 similar to that illustrated in FIG. 1.

As illustrated in FIGS. 9–16 there is provided a "V"-type, four-cycle engine 222 having six combustion chambers 259. The engine 222 may have a greater or lesser number of combustion chambers, such as two, four, or eight or more.

Figure 13:
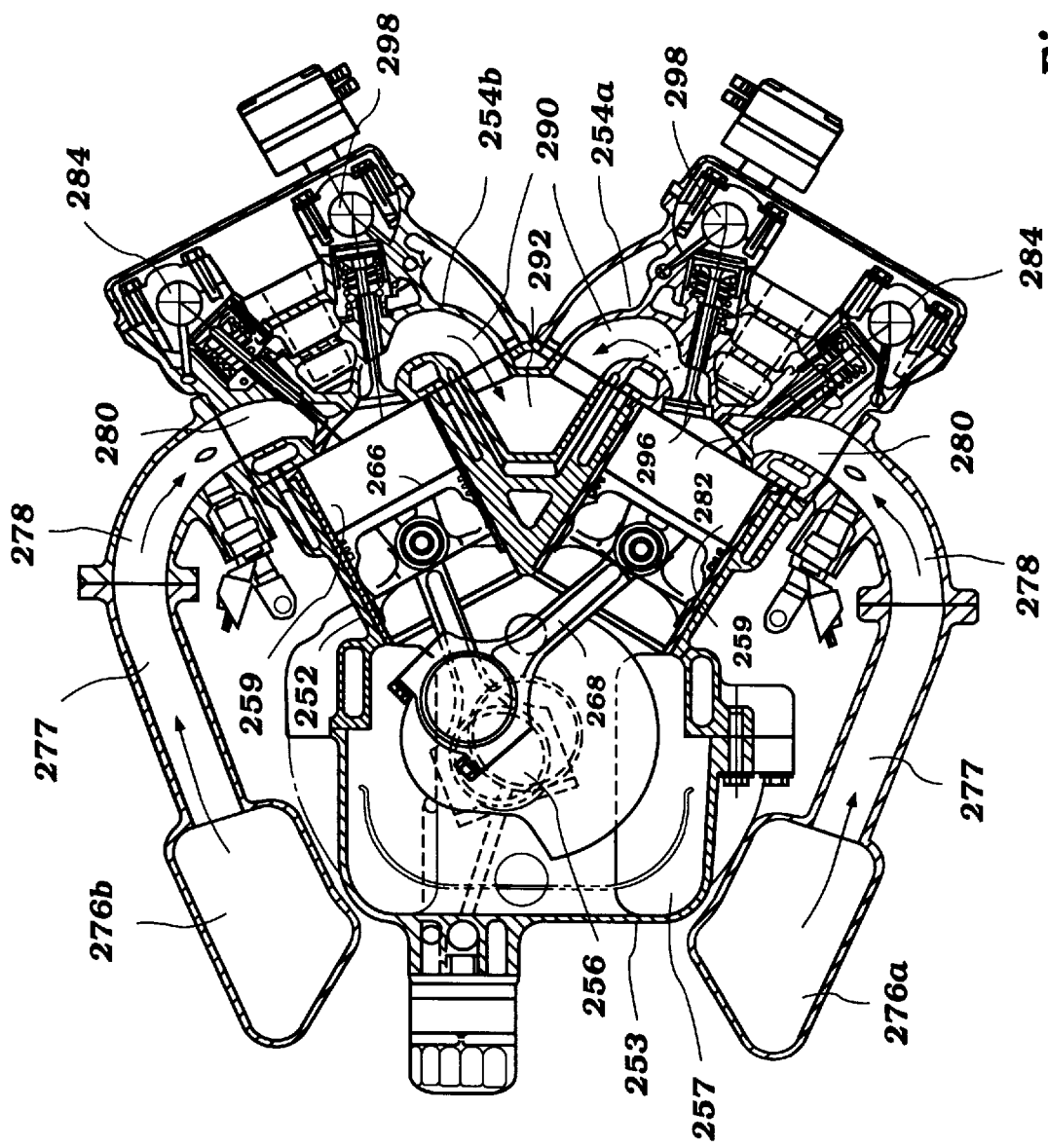
FIG. 13 is a top, cross-sectional view of the engine illustrated in FIG. 9 illustrating a cylinder block, a pair of heads connected thereto, and an exhaust manifold having a cooling arrangement in accordance with the present invention.

As best illustrated in FIG. 13, the engine 222 has a cylinder block 252 with a first cylinder head 254a and a second cylinder head 254b connected thereto, defining first and second cylinder banks. Each bank of cylinders preferably defines three combustion chambers 259.

A piston 266 is movably positioned in each combustion chamber 259. Each piston 266 is connected to a connecting rod 268 extending to a vertically extending crankshaft 256.

The crankshaft 256 is journalled for rotation with respect to the cylinder block 252. A crankcase cover 253 engages an end of the block 252, defining therewith a crankcase chamber 257 within which the crankshaft rotates. The crankshaft 256 is arranged to drive a propeller, in like manner to the engine 22, described above.

As with the engine 22 described above, the engine 222 includes an air intake system for providing air to each combustion chamber 259. As illustrated in FIGS. 9, 12, 13 and 15, air passes through the vent 32 in the motor cowling 30 through an opening 271 of an air plenum 272, and therethrough to a main intake pipe 273. The air plenum 272 is positioned above a flywheel cover 274. The pipe 273, in turn, branches to first and second surge tanks 276a,b having branches 277 extending therefrom. Preferably, each surge tank 276a,b has a three branches 277 extending therefrom, one for each combustion chamber 259 in a bank.

Each branch 277 extends to a corresponding passage 278 through an intake manifold 279. Each passage 278 extends to a corresponding intake passage 280 extending through the cylinder head 254a,b to one of the combustion chambers 259.

Means are provided for controlling the flow of air into each combustion chamber 259. Preferably, this means comprises an intake valve 282 corresponding to each intake passage 280. As illustrated, all of the intake valves 282 for each bank of cylinders are preferably actuated by a single intake camshaft 284. Each intake camshaft 84 is mounted for rotation with respect to its respective cylinder head 254a,b and connected thereto with one or more brackets. The camshafts 284 are enclosed by a camshaft cover 288 which is connected to each head 254a,b.

An exhaust system is provided for routing the products of combustion within the combustion chambers 259 to a point external to the engine 222. In particular, an exhaust passage 290 leads from each combustion chamber to a passage 292 in an exhaust manifold portion 294 of the engine 222. The remainder of the exhaust system will be described in more detail below.

Means are also provided for controlling the flow of exhaust from each combustion chamber 259 to its respective exhaust passage 290. Preferably, this means comprises an exhaust valve 296. Like the intake valves 282, the exhaust valves 296 of each cylinder bank are preferably all actuated by a single exhaust camshaft 298. Each exhaust camshaft 298 is journalled for rotation with respect to its respective cylinder head 254a,b and connected thereto with a bracket. Each exhaust camshaft 298 is enclosed within the camshaft cover 288.

Figure 9:
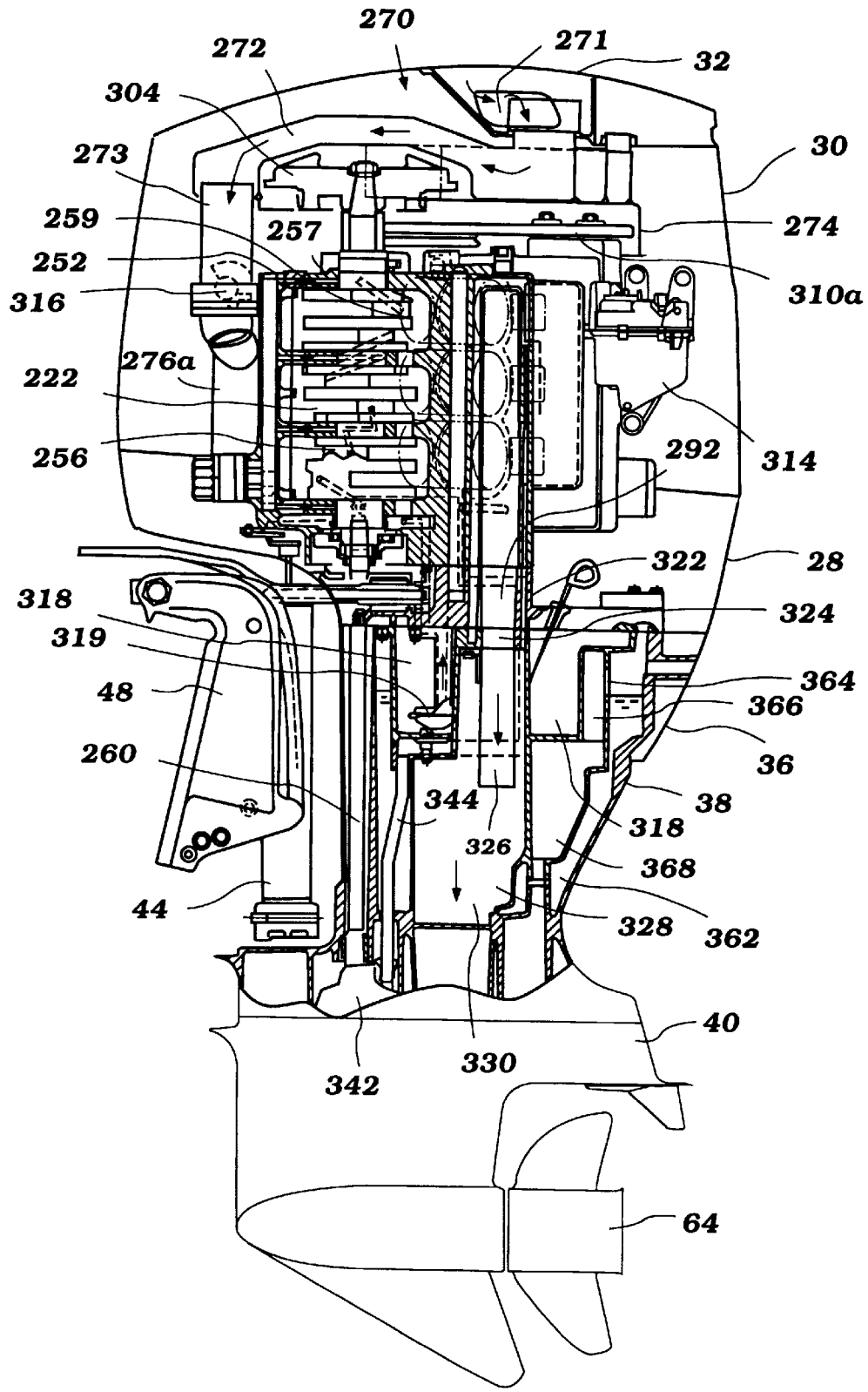
FIG. 9 is a side view, in partial cross-section illustrating an internal combustion engine of the "V"-type having an exhaust manifold cooling arrangement in accordance with the present invention for use in powering a motor similar to that illustrated in FIG. 1.
Figure 12:
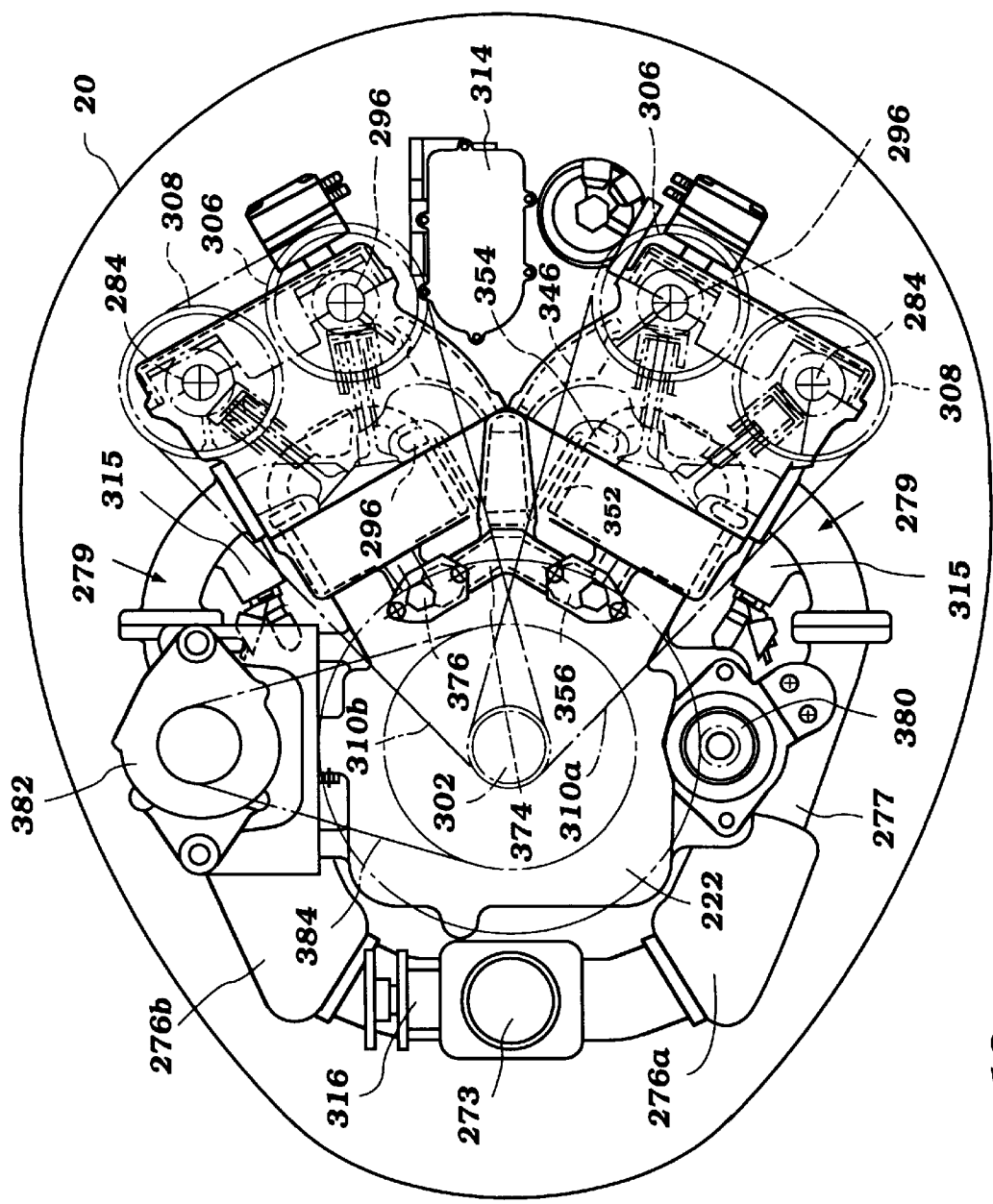
FIG. 12 is a top view of the engine illustrated in FIG. 9.

As best illustrated in FIGS. 9 and 12, means are provided for driving the camshafts 284,298. A timing belt pulley 302 is mounted on a top end of the crankshaft 256 positioned outside of the cylinder block 252, and just below a flywheel 304 also positioned on the crankshaft 256. An exhaust camshaft pulley 306 is mounted on an end of each exhaust camshaft 298 extending from the top end of the engine 222, and an intake camshaft pulley 308 is mounted on an end of each intake camshaft 284 extending from the top end of the engine. A first drive belt 310a extends around the timing belt pulley 302 and the exhaust and intake camshaft pulleys 206,208, corresponding to a first cylinder bank, and a second drive belt 310b extends around the timing belt pulley 302 and the exhaust and intake camshaft pulleys 206,208 of the other cylinder bank. By this arrangement, the camshaft 256 indirectly drives the camshafts 284,298. One or more tensioner pulleys (not shown) may be provided for maintaining the belt in a taunt condition.

A fuel delivery system is provided for delivering fuel to each combustion chamber 259 for combustion therein. The fuel delivery system preferably includes a fuel tank (not shown) and a fuel pump (not shown) for pumping fuel from the tank and delivering it to each combustion chamber 259. A vapor separator 314 may be included in the fuel system, and preferably, the fuel is injected into the air stream flowing through each air intake branch 277 with a fuel injector 315.

A throttle 316 is provided for controlling the flow of air into the combustion chambers 259. Preferably, the throttle 316 comprises a moveable plate positioned within air intake pipe 273. The throttle 316 is preferably controlled through a cable by the operator of the watercraft 24.

A suitable ignition system is provided for igniting an air and fuel mixture within each combustion chamber 259. Such systems are well known to those skilled in the art, and as such forms no portion of the invention herein, such is not described in detail here.

The engine 222 includes a lubricating system for providing lubricant to the various portions of the engine. The lubricating system is not described in detail here, and may be of any type found suitable to those skilled in the art. Generally, the lubricating system includes an oil reservoir 318 positioned below the engine 222. The reservoir 318 is in communication with an oil pump (not shown) via a suction tube 319. The oil pump may be positioned on the end of the crankshaft 256 at the bottom of the engine 222. The oil pump pumps lubricant from the reservoir 318 through oil passages throughout the engine 222. The pumped oil drains from the engine 222 back to the reservoir 318 for recirculation by the pump.

Figure 14:
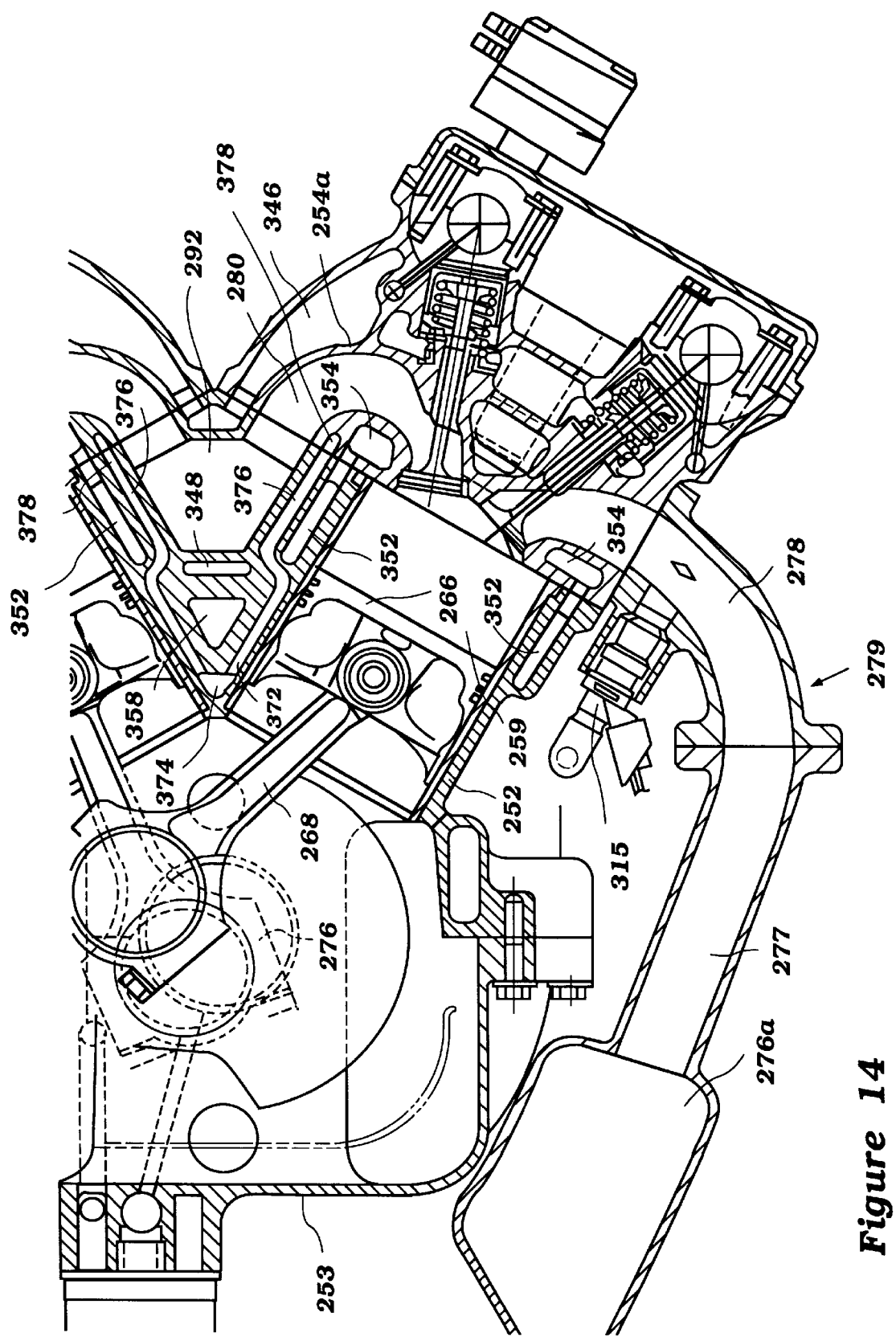
FIG. 14 is an enlarged view of that portion of the engine illustrating the cooling arrangement for the exhaust manifold of the engine illustrated in FIG. 13.
Figure 15:
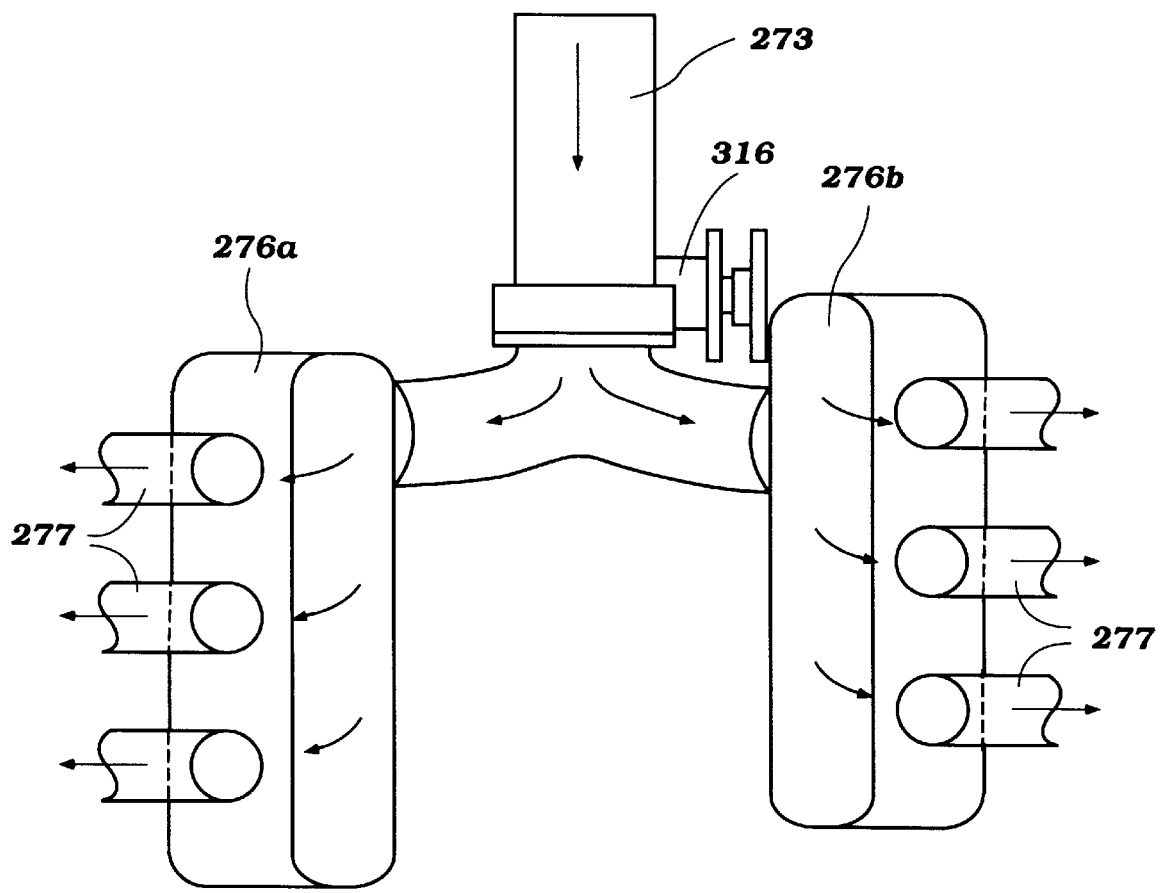
FIG. 15 is a schematic view illustrating the air intake system of the engine illustrated in FIG. 9.

As illustrated in more detail in FIGS. 13 and 14, the exhaust manifold is preferably formed integrally with the cylinder block 252. In this arrangement, the common exhaust passage 292 is simply a passage extending generally vertically through a the portion of the cylinder block 252 located in the valley between the cylinder banks.

Figure 10:
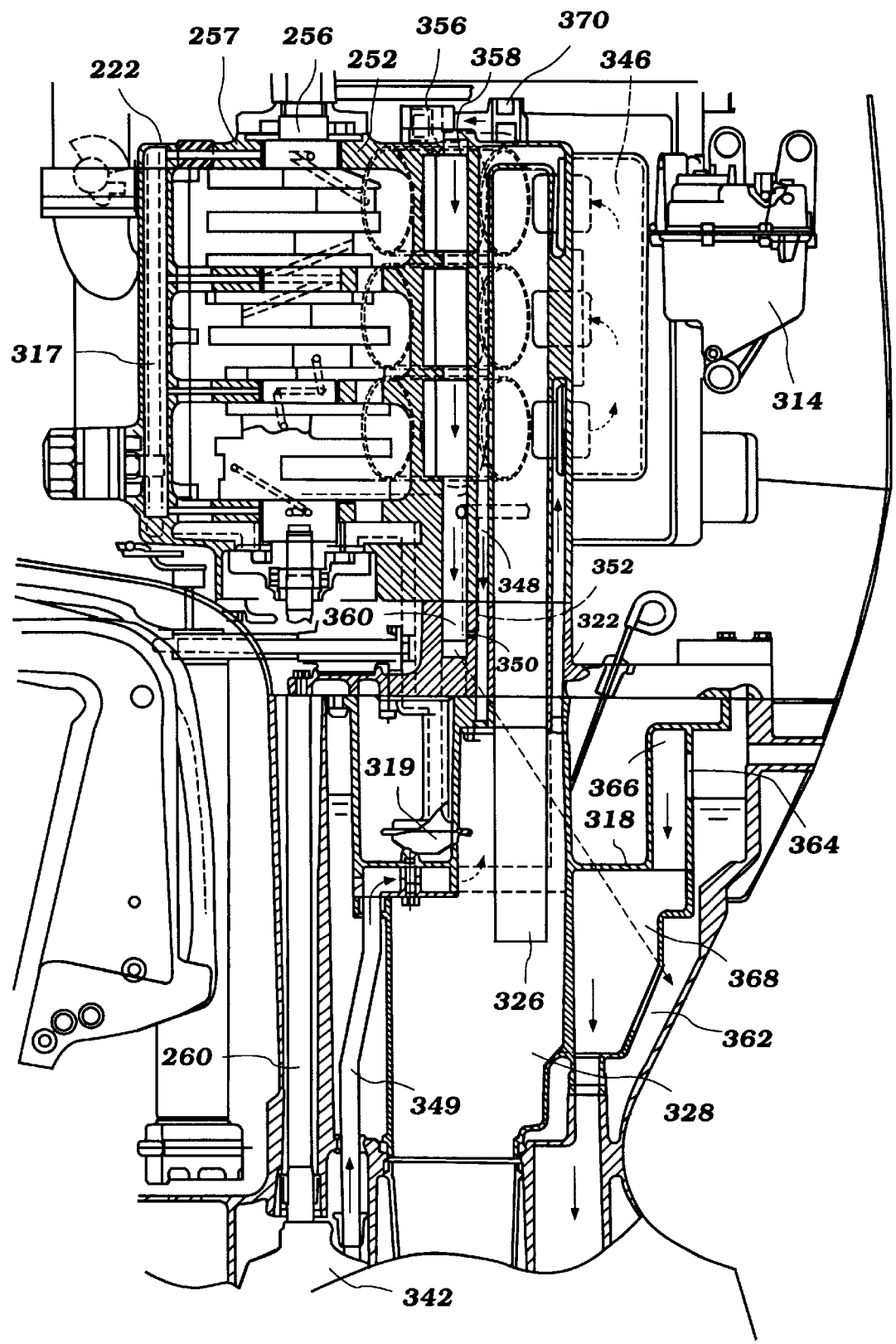
FIG. 10 is an enlarged, partial cross-sectional side view of the engine illustrated in FIG. 9.
Figure 11:
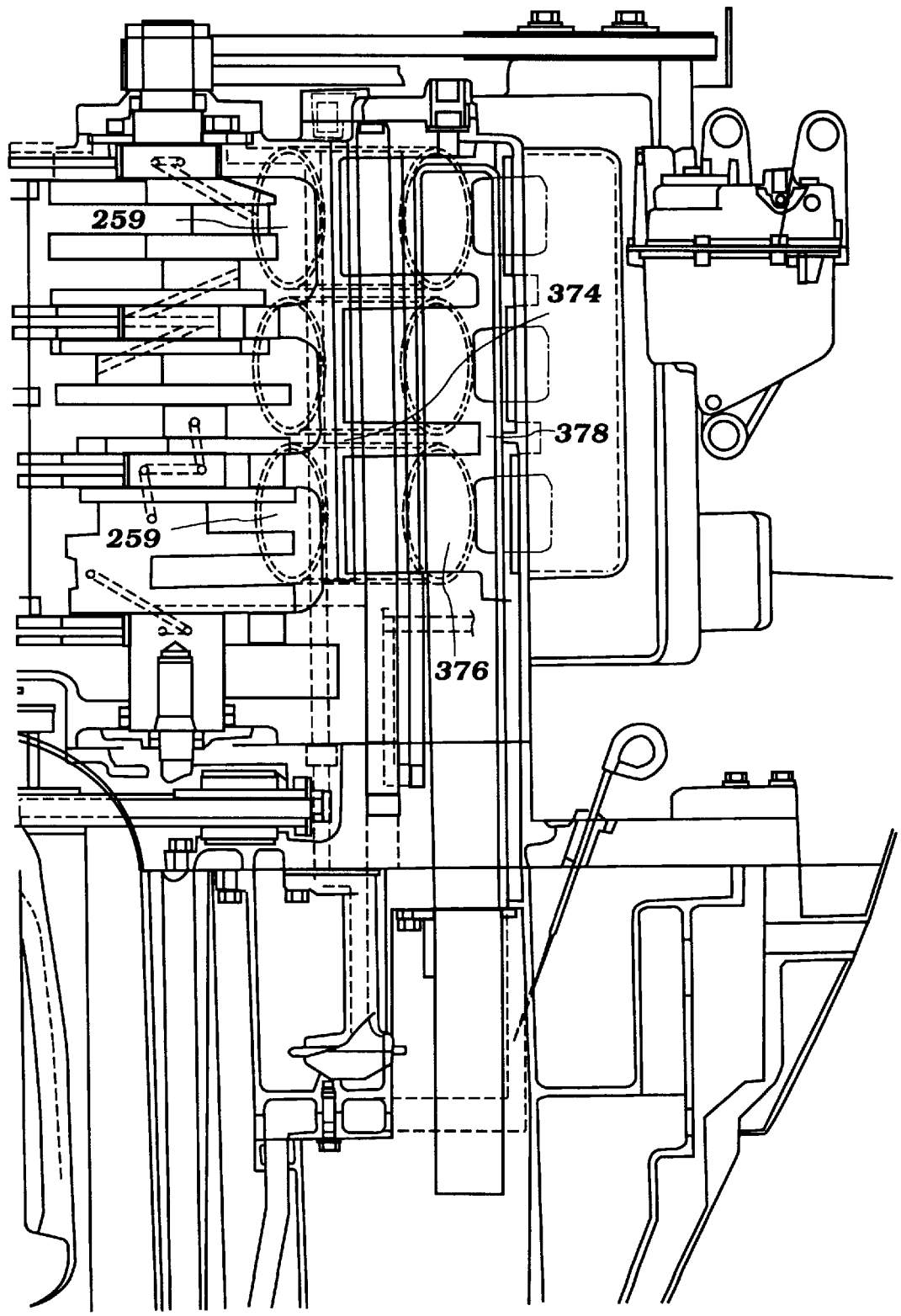
FIG. 11 is an enlarged view of a portion of the engine illustrated in FIG. 10.

As best illustrated in FIG. 10, an exhaust guide 322 is positioned at the bottom end of the engine 222. The exhaust guide 322 has a passage 324 extending therethrough which is aligned with the common exhaust passage 292 at its top side. An exhaust pipe 326 is connected to the bottom side of the exhaust guide 322 in alignment with the passage 324. The exhaust pipe 326 terminates within a chamber formed within a muffler 328.

The muffler 328 is positioned within the lower unit 38 and between the drive shaft 260 and a cooling water drain system. An exhaust gas outlet 330 is provided in the bottom end of the muffler 328, through which the exhaust gas is routed to a point external of the motor 20.

As best illustrated in FIGS. 9–10, 14 and 16, a cooling system is provided for cooling the engine 222. More particularly, and in accordance with the present invention, the cooling system serves to cool the exhaust manifold area 294 of the engine, and reduce the transmission of heat from the exhausted gases through the walls defining the common exhaust passage 292 to the combustion chambers 259. Preferably, this cooling system accomplishes cooling with both air and water.

Figure 16:
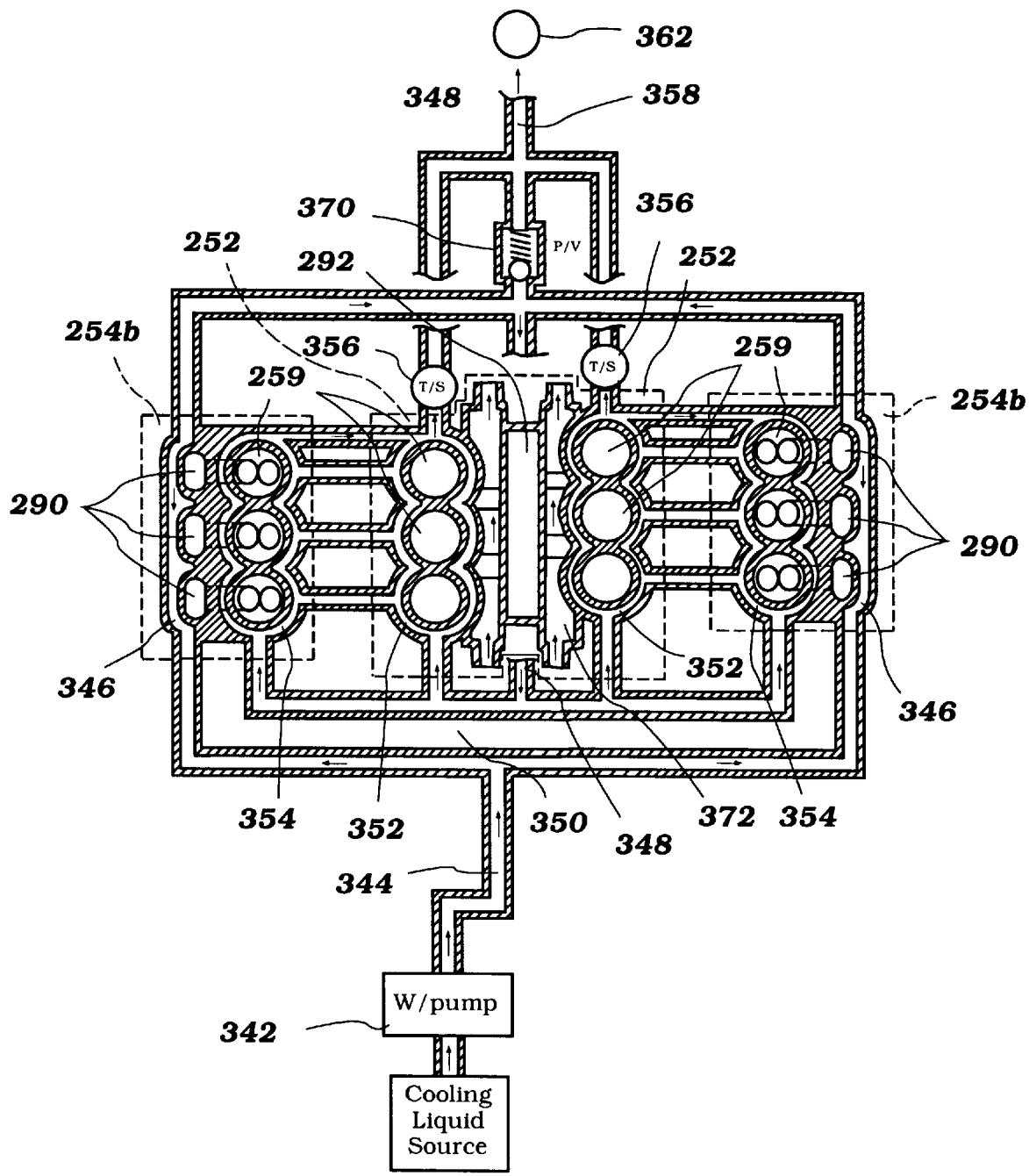
FIG. 16 is a schematic view illustrating the cooling water system of the engine illustrated in FIG. 9.

First, cooling water is pumped by a water pump 342 positioned in the lower unit 34 from the body of water in which the motor 222 is positioned. The pump 342 is preferably driven by the drive shaft 260, and expels the cooling water upwardly through a cooling water delivery pipe 344. This coolant passes through a number of cooling water passages throughout the cylinder block 252 and heads 254a,b. As best illustrated in FIGS. 9, 14 and 16, the pipe 344 branches to provides cooling water to a passage 346 in each cylinder head 254a,b adjacent the exhaust passages 290. These passages 346 lead to connecting passages 348 and 350. These connecting passages 350 lead to cooling water passages 352,354 in the form of cooling jackets, surrounding the portions of the cylinder block 252 and heads 254a,b defining the combustion chambers 259.

A thermostat 356 is provided corresponding to each cylinder bank between the passages 352 in the cylinder block 252 surrounding the combustion chambers 259 and a cooling water return passage 358, for controlling the flow of cooling water through the heads and block. The cooling water return passage 358 extends through the cylinder block 252 to a connecting passage 360 which leads into the lower unit 34 to a cooling water pool or chamber 362. This chamber 362 extends about the muffler 328, and oil reservoir 318. When the water level in the chamber 362 becomes to high, the cooling water runs over an overflow ledge 364 downwardly through a passage 366 leading to a drain 368. The cooling water which is diverted to the drain 368 is discharged from the motor.

In that instance where the pressure of the cooling water within the cylinder block and heads 352,254 becomes too high, a pressure relief valve 370 diverts cooling water from the engine 222 to the chamber 362. Preferably, the pressure relief valve 370 is positioned along the cooling water flow path through the engine 222 before the cooling water passage 352,354 surrounding the combustion chambers 259.

As best illustrated in FIGS. 14 and 16, the engine 222 of the present invention includes means for cooling and insulating for reducing the transmission of heat from the exhaust flowing through the exhaust passage 292 to the combustion chambers. Preferably, this means comprises a passage or space 372 in the block 252 and heads 254a,b. In particular, a common passage 374 extends generally vertically through the block 252 in the valley formed between the cylinder banks. Passages 376 extend outwardly from the common passage 374 within the cylinder block 252 in the wall defining the combustion chambers 259 of each cylinder bank, and between the combustion chambers 259 and the exhaust passage 292 extending through the block 252. Preferably, each passage 376 has an enclosed end 378 formed within a corresponding portion of the attached cylinder head 254a,b.

This air-filled passage or space 372 serves, like the space 166 described above, to reduce the rate of heat transfer from exhaust gases flowing through the common exhaust passage 292 to the adjacent combustion chambers 259. Preferably, the passage 372 is open at the top end of the cylinder block 22, whereby as the air therein is heated, the hot air rises (in the direction illustrated in FIG. 16) and cooler air is drawn into the passage 372 to replace it.

As illustrated in FIG. 12, the engine 222 may also include a starter 380 which selectively engages the flywheel 304 for use in starting the engine. In addition, the engine 222 may include an alternator 382 which is driven by the crankshaft 256 by a belt 384. These and other engine accessories may be provided as well known to those skilled in the art.

While in the above-description the cooling or insulating spaces 166, 374, 376 have been described as being air filled, it should be understood that the space may be void (i.e. substantially devoid of air and other material) or filled with another material which does not readily transmit heat, i.e. another insulating material. Thus, the space could be filled with liquid or even a solid.

It is noted that one particular advantage of the cooling arrangement of the present invention is that it is effective in preventing heat transfer from the exhaust gases passing through the common exhaust passage to the adjacent combustion chambers when the exhaust passage is formed directly in the cylinder block. In this manner, the engine may be compact for outboard motor and other applications, and yet is protected from damage.

It is contemplated that the above-described cooling arrangement may be utilized on other types and arrangements of engines. In addition, the cooling system may be utilized where more than one exhaust passage guides exhaust from the combustion chambers through the engine block.

Of course, the foregoing description is that of preferred embodiments of the invention, and various changes and modifications may be made without departing from the spirit and scope of the invention, as defined by the appended claims.

What is claimed is:

1. An improved internal combustion engine, said engine having a cylinder block forming at least one cylinder bore terminating in an end surface thereof, at least one cylinder head having a surface facing said cylinder block end surface and connected thereto in an abutting relationship, said cylinder head surface having a portion closing said cylinder bore cooperating therewith to define a least one combustion chamber therein, an exhaust passage formed in said cylinder head and extending from an inlet end in said closing portion to an outlet end formed in a portion of said cylinder head surface facing a portion of said cylinder block end surface spaced outwardly from said cylinder bore, said cylinder head exhaust passage communicating with a common exhaust passage extending through said cylinder block from its end surface to an exhaust pipe, and further including an air space formed in said cylinder block between said cylinder bore and said common exhaust passage for reducing the amount of heat transferred between exhaust flowing through said common exhaust passage and said combustion chamber.

2. The engine in accordance with claim 1, wherein said air space is defined by a passage extending inwardly from an outer surface of said cylinder block.

3. The engine in accordance with claim 1, wherein said air space is a hollow space enclosed by said cylinder block.

4. The engine in accordance with claim 1, wherein said air space extends into said cylinder head.

5. The engine in accordance with claim 1, wherein said engine has at least two combustion chambers arranged vertically, said common exhaust passage is vertically extending, and wherein an air space is provided between said common exhaust passage and each combustion chamber, said air spaces arranged vertically.

6. The engine in accordance with claim 1, wherein said cylinder block defines a first cylinder bank and a second cylinder bank arranged in generally a "V" configuration, with a valley therebetween and a pair of cylinder heads connected to said cylinder block for defining a first bank of combustion chambers and a second bank of combustion chambers, and wherein said air space is formed in said cylinder block in a wall portion thereof defining each bank, said air space being generally "V" shaped.

7. An outboard motor for powering a watercraft in combination with an engine in accordance with claim 1, said outboard motor having a cowling, said engine positioned within said cowling, and a water propulsion device, said engine including a crankshaft extending generally vertically and arranged to drive said water propulsion device.

8. The outboard motor in accordance with claim 7, wherein said air space extends to an outer surface of said cylinder block.

9. The outboard motor in accordance with claim 7, wherein said engine is of the inline variety, having a plurality of the combustion chambers arranged along a single plane extending parallel to said crankshaft, and wherein said common exhaust passage extends generally parallel to said axis, and wherein an air space is positioned between said common exhaust passage and each combustion chamber, said air spaces separated by a web portion of said cylinder block.

10. The outboard motor in accordance with claim 7, wherein said air space extends into a portion of said cylinder head.

11. The outboard motor in accordance with claim 7, wherein said engine is of the "V"-type, said cylinder block defining a first bank and a second bank, and including a cylinder head connected to said first bank and cylinder head connected to said second bank, and wherein said common exhaust passage extends through a valley of said cylinder block between said banks, and wherein said air space is generally "V" shaped.

12. The outboard motor in accordance with claim 11, wherein said air space has a central portion underlying said common exhaust passage, a second portion extending through a portion of said cylinder block defining said first bank, and a third portion extending through a portion of said cylinder block defining said second bank.

13. The outboard motor in accordance with claim 12, wherein said second and third portions terminate in said cylinder heads.

\* \* \* \* \*